US012765712B2

(12) United States Patent
Tofaili et al.

(10) Patent No.: US 12,765,712 B2
(45) Date of Patent: Oct. 20, 2026

(54) INLINE CAVITATION REDUCTION FOR A BEVERAGE APPLIANCE

(71) Applicant: Breville Pty Limited, Alexandria (AU)

(72) Inventors: Ali Tofaili, Alexandria (AU); Luichang Zheng, Alexandria (AU); Michael Yui Ko Wong, Alexandria (AU); Sing Wai Ng, Alexandria (AU); Kai Xiao, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 879 days.

(21) Appl. No.: 18/025,550

(22) PCT Filed: Sep. 9, 2021

(86) PCT No.: PCT/AU2021/051047

§ 371 (c)(1), (2) Date: Mar. 9, 2023

(87) PCT Pub. No.: WO2022/051812

PCT Pub. Date: Mar. 17, 2022

(65) Prior Publication Data

US 2023/0363578 A1 Nov. 16, 2023

(30) Foreign Application Priority Data

Sep. 10, 2020 (AU) ................................ 2020903258

(51) Int. Cl.
*A47J 31/46* (2006.01)
*A47J 31/36* (2006.01)
*A47J 31/52* (2006.01)

(52) U.S. Cl.
CPC ............. *A47J 31/468* (2018.08); *A47J 31/36* (2013.01); *A47J 31/469* (2018.08); *A47J 31/5255* (2018.08)

(58) Field of Classification Search
CPC .... A47J 31/468; A47J 31/5255; A47J 31/469; A47J 31/36

(Continued)

(56) References Cited

U.S. PATENT DOCUMENTS 4,512,722 A * 4/1985 Mouton .................. F04C 14/02 417/205
6,663,349 B1 * 12/2003 Discenzo ............ F04D 15/0245 417/44.1

(Continued)

FOREIGN PATENT DOCUMENTS

AU 2015101973 A4 11/2015
CN 104602578 A 5/2015

(Continued)

OTHER PUBLICATIONS

Office Action mailed Aug. 27, 2025 from Chinese Application No. 202180073323.1.

(Continued)

*Primary Examiner* — Elizabeth M Kerr
*Assistant Examiner* — Simpson A Chen
(74) *Attorney, Agent, or Firm* — Quarles & Brady, LLP

(57) ABSTRACT

An appliance for making a beverage comprising: a conduit defining a liquid flow path for the liquid; a pump to move the liquid under pressure along the flow path and configured to operate in a first mode and a second mode, different to the first mode, a sensor assembly configured to determine a first flow rate of the liquid in the flow path when the pump operates in the first mode and determine a second flow rate when the pump operates in the second mode; and a controller operatively coupled with the pump and the sensor assembly and configured to cause the pump to switch from the first mode to the second mode if the first flow rate is below a first threshold and to cause the pump to switch from the second mode to the first mode if the second flow rate is above a second threshold. In the second mode, the pump causes the liquid to move under increased pressure than in the first mode to at least aid in resolving cavitation. A (Continued)

method of controlling the appliance to make a beverage is also disclosed.

20 Claims, 12 Drawing Sheets

(58) Field of Classification Search
USPC ........................................................ 99/280
See application file for complete search history.

(56) References Cited

U.S. PATENT DOCUMENTS

| | | | | |
|---|---|---|---|---|
| 10,292,523 | B2 | 5/2019 | Duvall | |
| 2006/0133941 | A1 | 6/2006 | Breithaupt | |
| 2016/0095465 | A1* | 4/2016 | Ait Bouziad | F04B 19/24<br>99/302 R |
| 2019/0269274 | A1* | 9/2019 | Duvall | A47J 31/5253 |

FOREIGN PATENT DOCUMENTS

| | | |
|---|---|---|
| JP | 2019048047 | 3/2019 |
| WO | 2014028844 A1 | 2/2014 |

OTHER PUBLICATIONS

Written Opinion of International Application No. PCT/AU2021/051047, mailed Nov. 2, 2021, 4 pages.
International Search Report of International Application No. PCT/AU2021/051047, mailed Nov. 2, 2021, 4 pages.
EESR of European Application No. 21865394.7 (3 pages).

* cited by examiner

INLINE CAVITATION REDUCTION FOR A BEVERAGE APPLIANCE

RELATED APPLICATIONS

The present application relates to and claims priority benefits from International Application No. PCT/AU2021/051047, filed on Sep. 9, 2021, which relates to and claims priority benefits from Australian Provisional Patent Application No. 2020903258, filed on 10 Sep. 2020, the contents of which are herein incorporated by reference in their entireties.

FIELD

The present invention relates generally to an appliance for making a beverage and a method for controlling thereof.

BACKGROUND

An appliance for heating a liquid to make a beverage, such as a coffee machine, typically includes a water tank, a water pump and a heater. The pump pumps water from the water tank via a conduit towards the heater for heating.

In various circumstances pockets of air may be trapped in a hydraulic system of the coffee machine, for example, when the water pump is energised while the water tank is empty. The water tank may become empty under several circumstances such as when the appliance is still new (out of the box) or if there is no water level detection system in the water tank resulting in the appliance being operated without water.

Such pockets of air block passage of the liquid through the hydraulic system thereby creating a phenomenon called cavitation, which is a form of an air lock or a vapor lock. Additionally, air bubbles may be formed due to a rotor spinning and pressure changes in the fluid, thus creating cavitation. These bubbles in the flow line cause a decrease in energy of the flow which may disrupt the fluid system. When cavitation occurs, water may not be able to be pumped through the system due to cavitation, even with the water tank being filled with water. In such instances, an otherwise sound coffee machine may become unfit for its purpose and be unable to make beverages due to cavitation in the hydraulic system.

SUMMARY OF INVENTION

It is an object of the present invention to substantially overcome, or at least ameliorate, one or more of the above disadvantages, or provide a useful alternative.

In accordance with one aspect of the present invention, there is provided an appliance for making a beverage, the appliance comprising: a conduit defining a liquid flow path for the liquid; a pump to move the liquid under pressure along the flow path, the pump is configured to operate in a first mode and a second mode, different to the first mode, in response to detecting cavitation, wherein the pump causes the liquid to move under increased pressure in the second mode than in the first mode to at least aid in resolving cavitation; a sensor assembly configured to determine a first flow rate of the liquid in the flow path when the pump operates in the first mode and determine a second flow rate when the pump operates in the second mode; and a controller operatively coupled with the pump and the sensor assembly and configured to cause the pump to switch from the first mode to the second mode if the first flow rate is below a first threshold and to cause the pump to switch from the second mode to the first mode if the second flow rate is above a second threshold.

In certain embodiments, the pump is configured to operate at a first pump speed in the first mode, and a second pump speed in the second mode, wherein the second pump speed is greater than the first pump speed.

In certain embodiments, the controller is configured to apply a delay for switching the pump from the second mode to the first mode if the first threshold and the second threshold are the same.

In certain embodiments, the first threshold is equal to the second threshold.

In certain embodiments, the controller is further configured to switch off the pump in response to detecting that the second flow rate is below the second threshold for a threshold period of time.

In certain embodiments, the controller is further configured to signal a warning system of the appliance that a water tank supplying water to the pump is empty in response to detecting that the second flow rate is below the second threshold for a predetermined period of time.

In certain embodiments, the controller is further configured to operate based on a user input.

In certain embodiments, the controller is configured to determine at which stage in a beverage making process the appliance operated prior to causing the pump to switch to the second mode and to determine parameters for switching the pump from the second mode to the first mode based on the determined stage.

In certain embodiments, the appliance further comprises a heater configured to heat the liquid moved by the pump, wherein the controller is further configured to cause the heater to switch off in response to detecting that the first flow rate is below the first threshold.

In certain embodiments, the controller is configured to switch on the heater in response to determining that the second flow rate is above the second threshold, the heater being switched on with heating parameters corresponding to heating parameters prior to the heater being switched off.

In accordance with another aspect of the present invention, there is provided a method of controlling an appliance to make a beverage, the method comprising: controlling a pump of the appliance to operate in a first mode to make the beverage; determining a first flow rate of the liquid in a flow path defined by a conduit during the first mode; controlling the pump to switch from the first mode to a second mode if the first flow rate is below a first threshold, wherein the pump is controlled to move the liquid under increased pressure in the second mode than in the first mode to at least aid in resolving cavitation; determining a second flow rate of the liquid in the flow path during the second mode; and controlling the pump to switch from the second mode to the first mode if the second flow rate is above a second threshold.

In certain embodiments, the method further comprises controlling the pump to operate in the first mode at a first pump speed, and controlling the pump to operate in the second mode at a second pump speed, wherein the second pump speed is greater than the first pump speed.

In certain embodiments, switching from the second mode to the first mode is delayed by a predetermined delay if the first threshold and the second threshold are the same.

In certain embodiments, the first threshold is equal to the second threshold.

In certain embodiments, the method further comprises controlling the pump to switch off in response to detecting that the second flow rate is below the second threshold for a threshold period of time.

In certain embodiments, the method further comprises, in response to detecting that the second flow rate is below the second threshold for a threshold period of time, signaling that a water tank supplying liquid to the pump is empty.

In certain embodiments, the pump is controlled based on a user input.

In certain embodiments, the method further comprises: determining at which stage in a beverage making process the appliance operated prior to switch to the second mode; and determining parameters for switching the pump from the second mode to the first mode based on the determined stage.

In certain embodiments, the method further comprises controlling a heater heating the liquid moved by the pump to switch off in response to detecting that the first flow rate is below the first threshold.

In certain embodiments, the method further comprises controlling the heater to switch on in response to determining that the second flow rate is above the second threshold, the heater is controlled to switch on with heating parameters corresponding to heating parameters prior to the heater being switched off.

Other aspects are also disclosed.

DESCRIPTION OF EMBODIMENTS

The present disclosure relates to an appliance 100 for making a beverage, for example, an espresso coffee machine. The appliance 100 typically heats the liquid to make a beverage, such as coffee. The appliance 100 may include a conduit defining a flow path for the liquid, a pump 108 moving the liquid under pressure along the flow path, a sensor assembly 106 configured to determine a flow rate of the liquid in the flow path, and a controller 1501 (see FIGS. 11A and 11B) operatively coupled with the pump 108 and the sensor assembly 106. Components of the appliance 100 for making a beverage will described in more detail below with reference to FIG. 1.

The pump 108 may be configured to operate in a first mode for making the beverage and switch to a second mode, different to the first mode, in response to detecting cavitation. The pump 108 typically causes the liquid to move under increased pressure in the second mode than in the first mode to at least aid in resolving cavitation.

The sensor assembly 106 determines a first flow rate of the liquid in the flow path when the pump 108 operates in the first mode and determines a second flow rate when the pump 108 operates in the second mode. For the purposes of the present disclosure, the flow rate may be considered to be equivalent to a flow counter detected, for example, by a flow meter. In alternative implementations, the flow rate may be determined as an amount of liquid flowing though the flow meter. The first flow rate and the second flow rate are used by the controller to determine whether to switch from the first mode to the second mode or vice versa. For example, the controller may cause the pump 108 to switch from the first mode to the second mode if the first flow rate is below a first threshold and to cause the pump 108 to switch from the second mode to the first mode if the second flow rate is above a second threshold.

Structural aspects of the controller are described below with references to FIGS. 11A and 11B. Processes executed by the controller to aid in resolving cavitation are described in more detail below with references to FIGS. 2 to 14.

Figure 1:
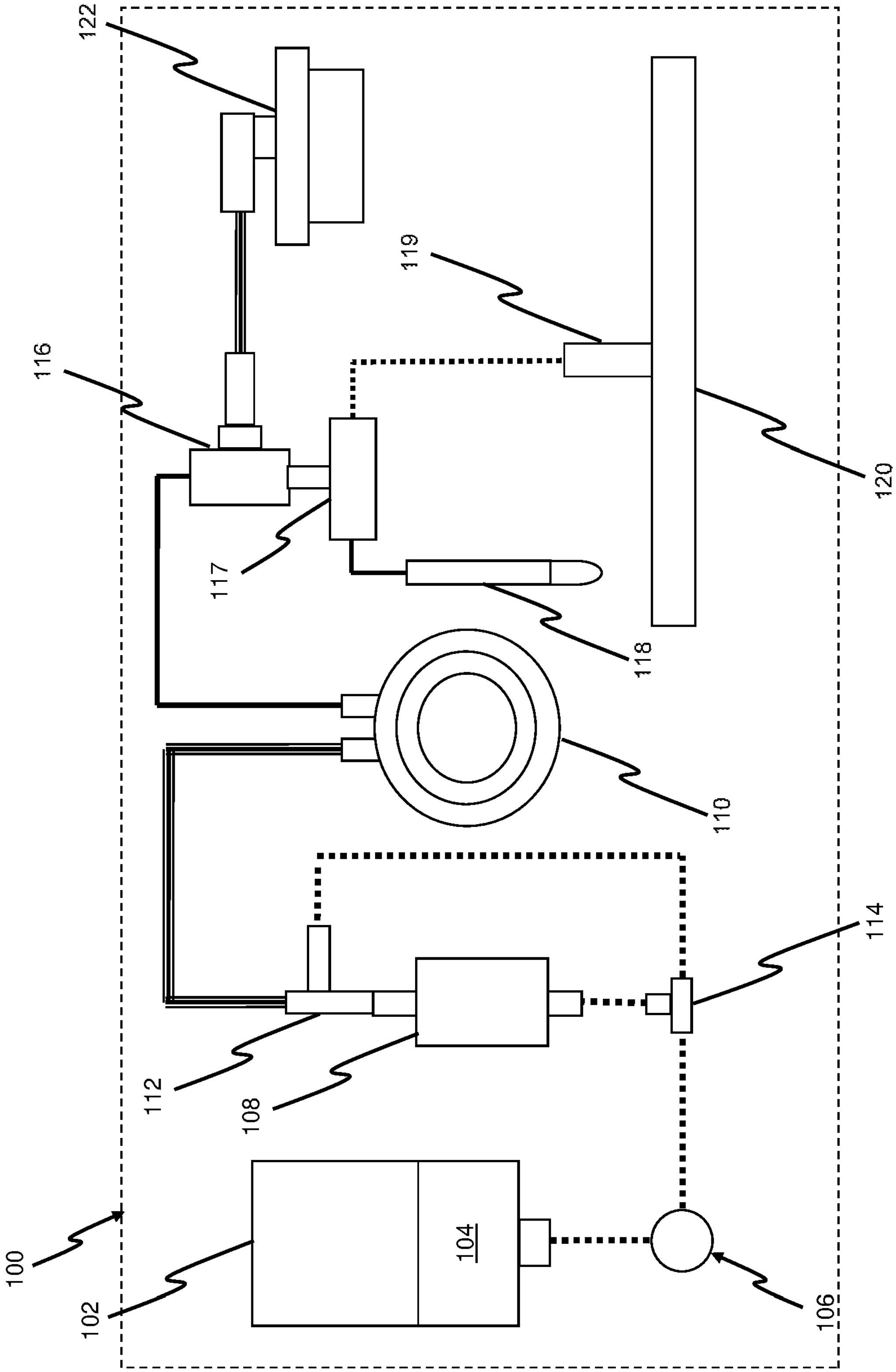
FIG. 1 is a schematic diagram of an appliance for making a beverage in accordance with an embodiment of the present disclosure.

FIG. 1 shows a schematic diagram of the appliance 100 upon which the herein described processes of the present disclosure can be implemented. The appliance 100 includes a water tank 102 to hold a water source 104 for providing water. The output of the water tank 102 is detected and quantified by the sensor assembly 106 that provides a flow signal to the controller 1501. In a preferred embodiment, the sensor assembly 106 is in the form of a flow meter having a turbine wheel mounted on a shaft which in turn is connected to a hall effect sensor. The turbine wheel is configured to rotate as water contacts the fins of the turbine wheel thereby triggering the hall effect sensor which generates a momentary pulse with each half or full revolution.

In order to determine the flow rate, the generated momentary pulse is sent to a microcontroller of the sensor assembly 106 every time there is a single or a half revolution of the flow meter. The microcontroller can then use that data to determine the flow rate or the flow counter. The flow rate or the flow counter can be expressed as a number of generated momentary pulses. Alternatively, the flow rate can be expressed as a number of generated momentary pulses per unit of time, for example, per second. It can be understood that the turbine wheel will not revolve if the pump is cavitated as no water is flowing. As such, the flow counter may be reset if substantially no rotation signal, e.g. momentary pulses, is detected for a prolonged period of time, which can be for example 3 seconds or longer. For the purposes of the present disclosure, the flow rate and the flow counter μC detected by the flow meter can be used interchangeably.

After the sensor assembly 106, the output of the water tank 102 is conveyed to the processor-controlled pump 108. The pump 108 supplies a heater 110 with the water. In a preferred embodiment, the heater 110 is a liquid flow through heater. The output of the pump 108 is regulated by an over pressure valve (OPV) 112 which returns excess pump pressure or flow to the inlet of the pump 108 by way of a T-joint 114 which conveys both the flow of water from the water tank 102 and the excess flow from the OPV 112 to the inlet of the pump 108. The OPV 112 is typically set to 10 bar. The conduits between the water tank 102, the sensor assembly 106, the T-joint 114 and the inlet of the pump 108 are typically in the form of silicone tubing secured at either end with ties, whilst the conduit between the outlet of the pump 108 and the inlet of the heater 110 is typically in the form of braided silicone tubing secured at either end with O-clips. The output of the heater 110 is preferably regulated by a 3/2 solenoid output control valve (SOV) 116. The heated water that leaves the output of the heater 110 is preferably conveyed to the SOV 116 by polytetrafluoroethylene (PTFE) tubing secured at either end with U-clips. When the SOV 116 is energised, the output of the heater 110 is regulated by a steam OPV 117 which directs the output to discharge via a discharge line (preferably formed of PTFE) into a steam wand 118 of the appliance 100 or is open to atmospheric overflow. The atmospheric overflow is preferably conveyed by silicone tubing to a purge connector 119 and into a drip tray 120 of the appliance 100. When the SOV 116 is de-energised, the output of the heater 110 is open to a shower head 122 of the appliance 100. The output of the heater 110 is preferably conveyed from the SOV 116 to the shower head 122 by braided silicone tubing.

Figure 2:
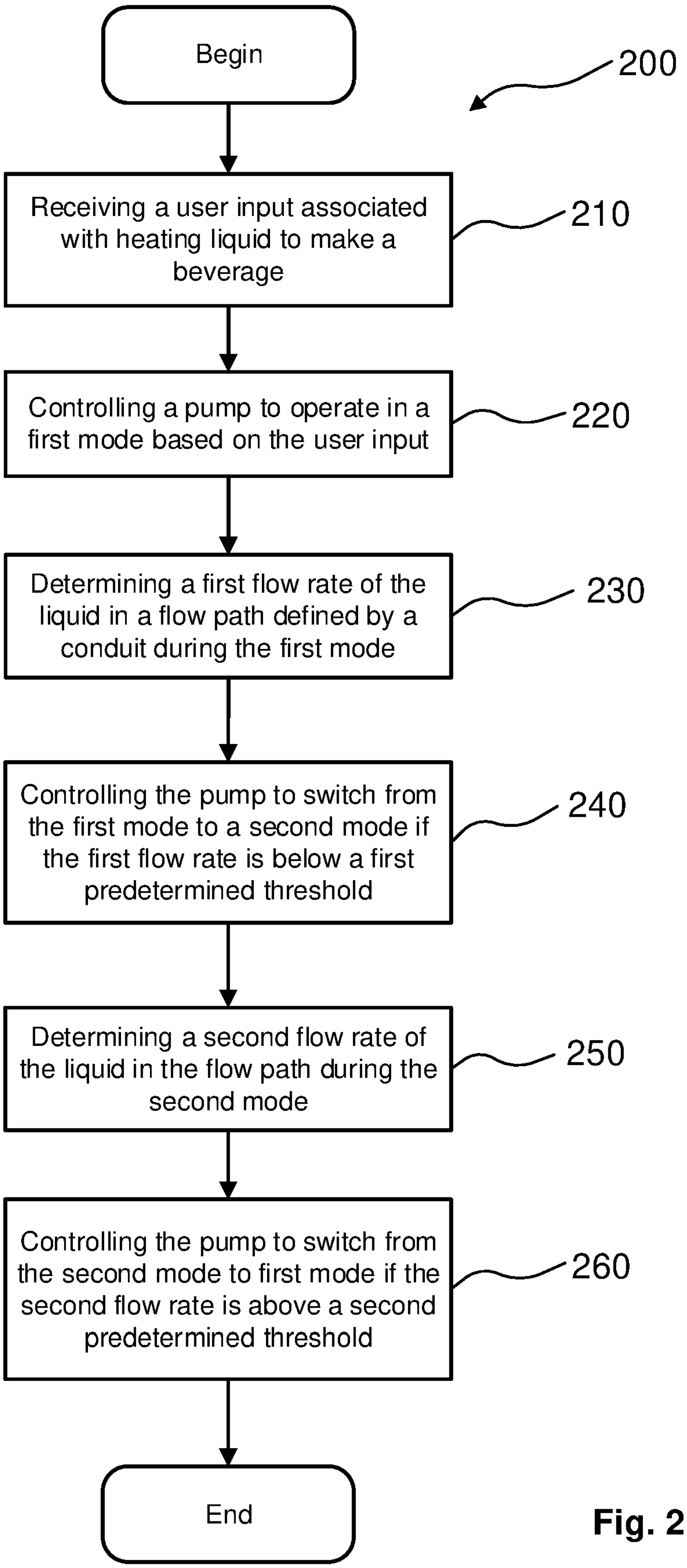
FIG. 2 is a flow diagram of the controller of the appliance of FIG. 1 in accordance with an embodiment of the present disclosure.

FIG. 2 shows a flow diagram of the controller in accordance with the present disclosure. The controller 1501 is controlled by a processor 1505 executing instructions of FIGS. 2 to 6 stored in internal storage ("memory") 1509 to cause the pump 108 to switch between different modes of operation.

At step 210, the controller 1501 receives a user input via input device 1513 associated with heating the liquid to make a beverage. The user input may select a particular beverage mode of the espresso coffee machine. For example, the selected beverage mode can be one of "Coffee mode", "Steam mode" and "Hot water mode". Specifically, in the steam mode the espresso coffee machine generates steam for frothing milk, in the hot water mode a hot water is output, and in the coffee mode coffee is infused with hot water to make an espresso shot.

Based on the user input received at step 210, the controller moves to step 220 to control operation of the pump 108 in the first mode at a first speed (or pump rate) based on the user input. The first mode of the pump 108 is configured to pump the liquid in accordance with requirements for a particular stage of a beverage making process. For example, in the first mode at step 220, the controller may set a different pump speed for two different user inputs. For example, the pump 108 may be set to operate at a rate of 55% of its capacity at a pre-infusion stage of the coffee mode selected at step 210 by the user and at a rate of 40% (or 55%) of its capacity at a pre-heat stage of a steam mode selected by the user at step 210. The different pump speeds for different user inputs may be stored in non-volatile memory 1509. At the pre-infusion stage the pump 108 typically operates for 4 seconds at the specified pump rate. The amount of time the pump 108 operates at each stage can be hard-coded in memory 1509 in a non-volatile manner, or, alternatively, can be changed by the user.

While the pump 108 is in the first mode, the controller 1501 may receive a signal at step 230 from the sensor assembly 106 indicating a first flow rate of the liquid in the flow path defined by the conduit. In some implementations, the sensor assembly 106 may indicate a value of the first flow rate to the controller 1501. Alternatively, the sensor assembly 106 may send a Boolean value indicating that the first flow rate is below the first threshold. The first threshold is preferably 3 momentary pulses. In response to receiving the indication from the sensor assembly 106, the controller 1501 can determine the first flow rate.

At step 240, the controller 1501 proceeds to controlling the pump 108 to switch from the first mode to a second mode (also referred to as a cavitation recovery mode) if the first flow rate is below the first threshold. The first threshold may be a predetermined threshold stored in memory 1509 in a non-volatile manner. A situation when the first flow rate is below the first threshold may be considered as an indication of cavitation ("air lock").

In the second mode at step 240, the controller controls the pump 108 to move the liquid under increased pressure than in the first mode to at least aid in resolving cavitation. The capacity at which the pump 108 should operate to at least aid in resolving cavitation can be fixed for each stage of coffee making process. In some implementations, the user can program operations of a motor of the pump 108 to eliminate or substantially reduce cavitation. Alternatively, for the sake of ease of product operation, programming operations of the motor can be kept as a hidden option which a technician can access. For example, the capacity of the pump 108 to at least aid in resolving cavitation can be set at 100%, 80% or 88.87%.

In other implementation, the capacity of the pump 108 may be based on the capacity at which the pump 108 was operating in the first mode. For example, if the pump 108 was operating at 55% capacity under control of the controller at step 220, the pump 108 may be controlled at step 240 to operate at 100% capacity in the second mode. If, however, the pump 108 was operating at 40% capacity in the first mode, the controller may control the pump 108 to operate at 90% capacity in the second mode, at least initially.

If the first flow rate is determined to be above the first threshold at step 230, the controller 1501 determines that the liquid is flowing through the hydraulic system of the appliance 100 as intended and returns control to step 220 to control the pump 108 in the first mode. Operation of the controller at steps 220 to 240 is described in more detail below with references to FIG. 3.

While the pump 108 is in the second mode, the controller 1501 may receive a signal at step 250 from the sensor assembly 106 indicating a second flow rate of the liquid in the flow path defined by the conduit. As discussed above, the sensor assembly 106 may indicate to the controller 1501 a value of the first flow rate or a Boolean value indicating that the second flow rate is above the second threshold. In response to receiving the indication from the sensor assembly 106, the controller 1501 may determine the second flow rate at step 250.

The controller 1501 then proceeds to step 260. At step 260, the controller 1501 controls the pump 108 to switch from the second mode back to the first mode if the second flow rate is above the second threshold. A situation where the second flow rate is above the second threshold indicates that cavitation or "air lock" is likely to have been resolved. In some implementations, the second threshold may be different to the first threshold. Alternatively, the second threshold may be equal to the first threshold.

Once the pump 108 is switched back to the first mode at step 260, the controller 1501 moves to step 220 to control the pump 108 in the first mode based on the user input received via the user input device 1513 at step 210. For example, if the pump 108 was operating at 55% capacity at step 220 before switching to the cavitation recovery mode, the pump 108 is controlled to return to the original power parameter of 55% capacity designated for that particular stage and mode of the beverage making process.

The controller 1501 may delay switching the pump 108 from the second mode to the first mode for a delay period. The delay period may be predetermined and set in memory 1509 in a non-volatile manner. The delay period can be, for example, 2 second since the time the controller 1501 first detected that the second flow rate is above the second threshold. Delaying switching the pump 108 back to the first mode is particularly advantageous if the first threshold is the same as the second threshold.

If, however, the second flow rate is below the second threshold for a threshold period of time or longer, the controller 1501 then controls the pump 108 and the heater 110, if the heater 110 has not been switched off already, to switch off and send a warning signal to a warning system of the appliance 100 that the water tank 102 is empty. The method 200 then concludes.

Figure 3:
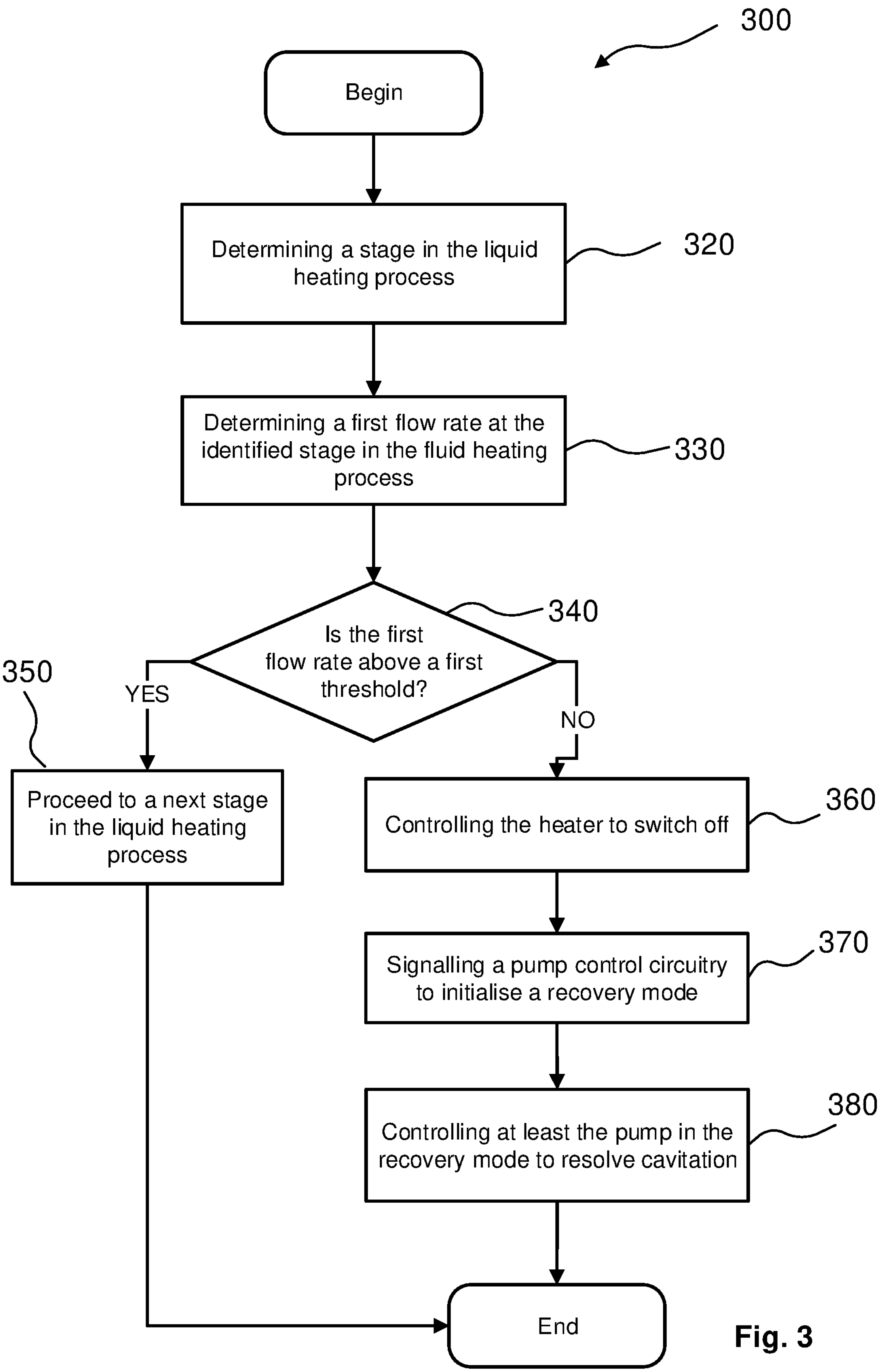
FIG. 3 is a flow chart showing operation of steps 220 to 240 of the controller.

FIG. 3 is a flow chart showing operation of the controller 1501 at steps 220 to 240 in more detail in accordance with method 300.

The method 300 is executed by the processor 1505 of the controller 1501. The method 300 starts at step 320 and determines a current stage in the beverage making process. The controller 1501 may additionally check, based on the user input at 210, whether the determined stage corresponds to a predetermined stage in the beverage making process where cavitation should be monitored. As such, the controller 1501 may only need to monitor the flow rate at the predetermined stage.

Figure 6:
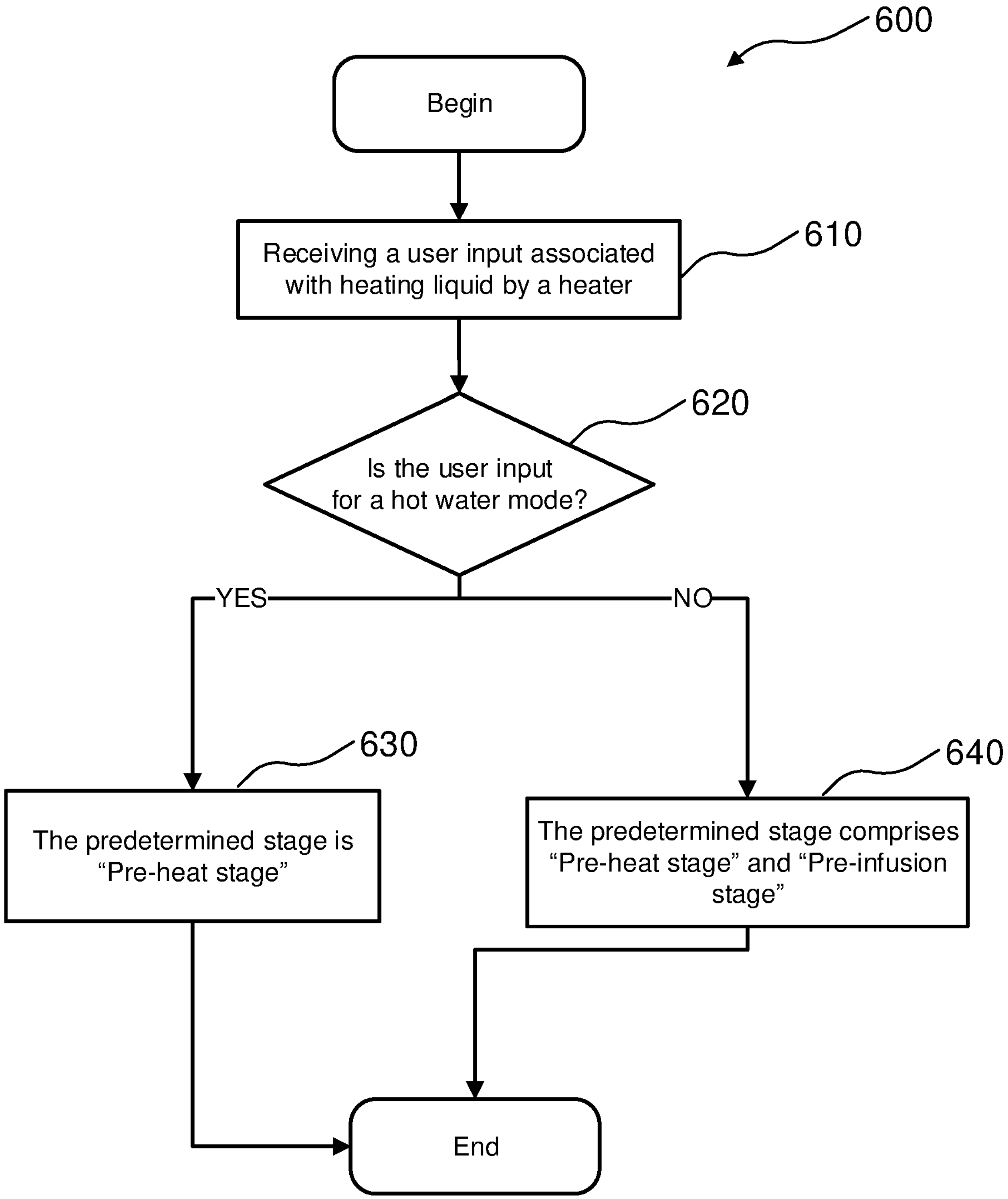
FIG. 6 is a flow chart showing steps of determining a stage in a beverage making process for monitoring a flow rate.
Figure 7:
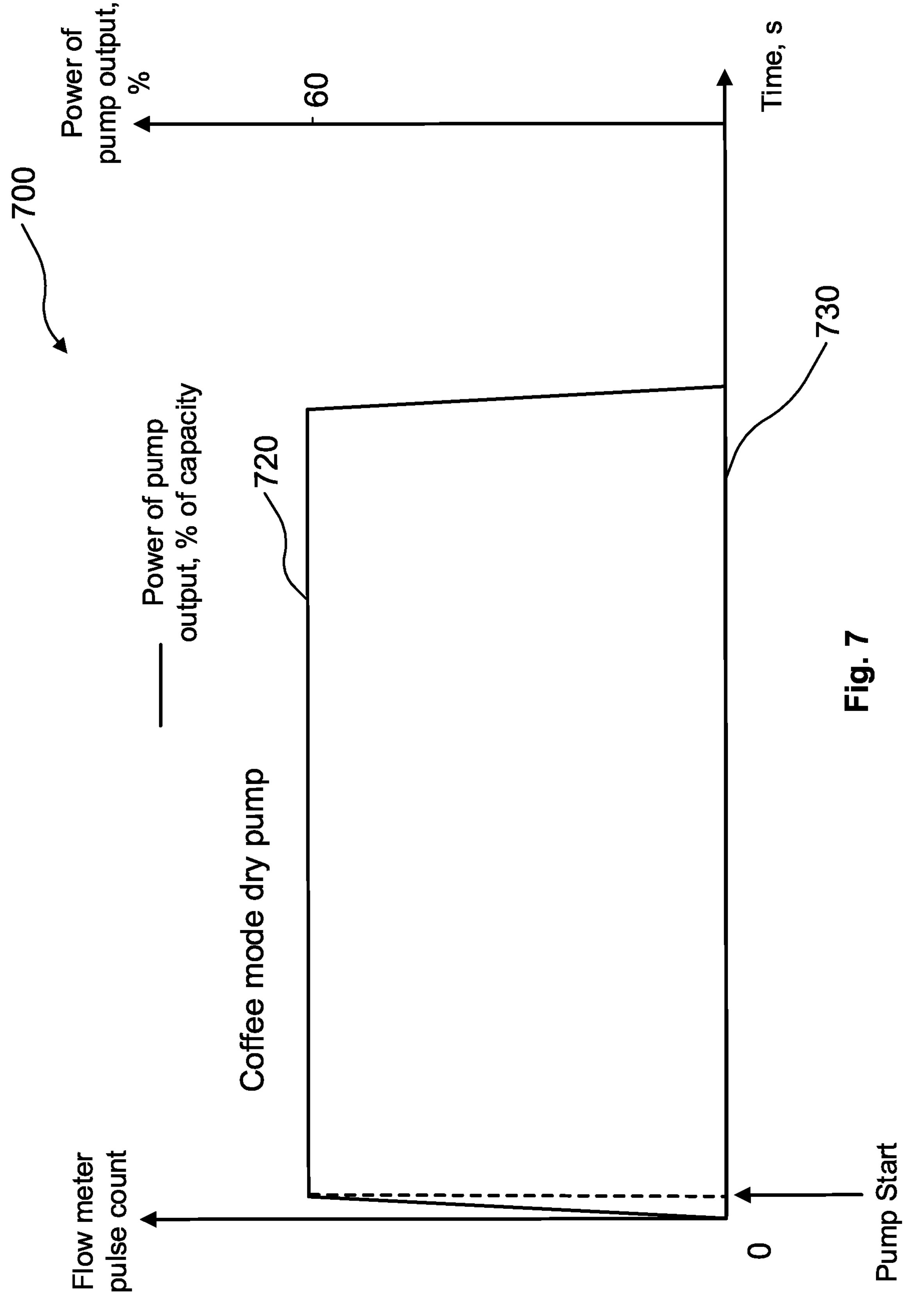
FIG. 7 is a schematic diagram illustrating dry pump or cavitation.

For example, as shown in FIG. 6, the controller 1501 may receive the user input 610 via the user input device 1513 and check if the user input corresponds to the hot water mode at step 620. If the hot water mode was selected by the user, the controller 1501 determines at step 630 that the selected stage is a pre-heat stage. Otherwise, for a coffee mode and for the steam mode the controller 1501 may determine at step 640 that the selected stage comprises a pre-heat stage and a pre-infusions stage. Consequently, the controller 1501 would only monitor the flow rate at the pre-heat state for the hot water mode. For the coffee mode and for the steam mode, the controller 1501 would only monitor the flow rate at the pre-heat and pre-infusion stages.

Once the current stage in the beverage making process is determined by the controller 1501 at step 320, the controller 1501 moves to step 330 to determine a first flow rate. As discussed above, in some embodiments, the first flow rate may be determined by the controller 1501 only at the predetermined stage. Alternatively, the first flow rate is determined irrespective of the current stage of the liquid heating process.

The control then moves to step 340 where the controller 1501 determines if the first flow rate is above the first threshold. If the controller 1501 determines that the first flow rate is above the first threshold at step 340, the controller 1501 concludes that there is no cavitation and that the liquid is flowing as intended. The controller 1501 then controls the appliance 100 to move to a next stage in the beverage making process. The method 300 then concludes.

If the controller determines that the first flow rate is below the first threshold at step 340, the controller 1501 determines that an air lock or cavitation is likely in the hydraulic system and then controls the appliance 100 to initialise a cavitation recovery mode at step 370. Specifically, the controller 1501 may store, in memory 1509 in a non-volatile manner, one or more of current heating parameters for the heater and current operating parameters, such as percentage of capacity, of the pump 108 for the determined current stage in the liquid heating process. Alternatively, the controller 1501 may store, in memory 1509 in a non-volatile manner, an indication of the current stage determined at step 320 which can then be used to determine parameters for the heater 110 and the pump 108 specific to that stage when the appliance 100 is controlled to resume normal operation.

Once relevant data is stored, the controller 1501 may control the heater 110 to switch off at step 360. In some implementations, the heater does not need to be switched off. If, however, the heater 110 was not switched off at step 360, the heater 110 will be switched off if the second flow rate is below the second threshold for a threshold period of time or longer. The controller 1501 also signals a pump control circuitry to initialize the cavitation recovery mode (second mode) at step 370. The controller 1501 then proceeds to controlling the pump 108 in the second mode at step 380. Operation of the controller 1501 in the cavitation recovery mode is described below with references to FIGS. 4 and 5. The method 300 then concludes.

Figure 4:
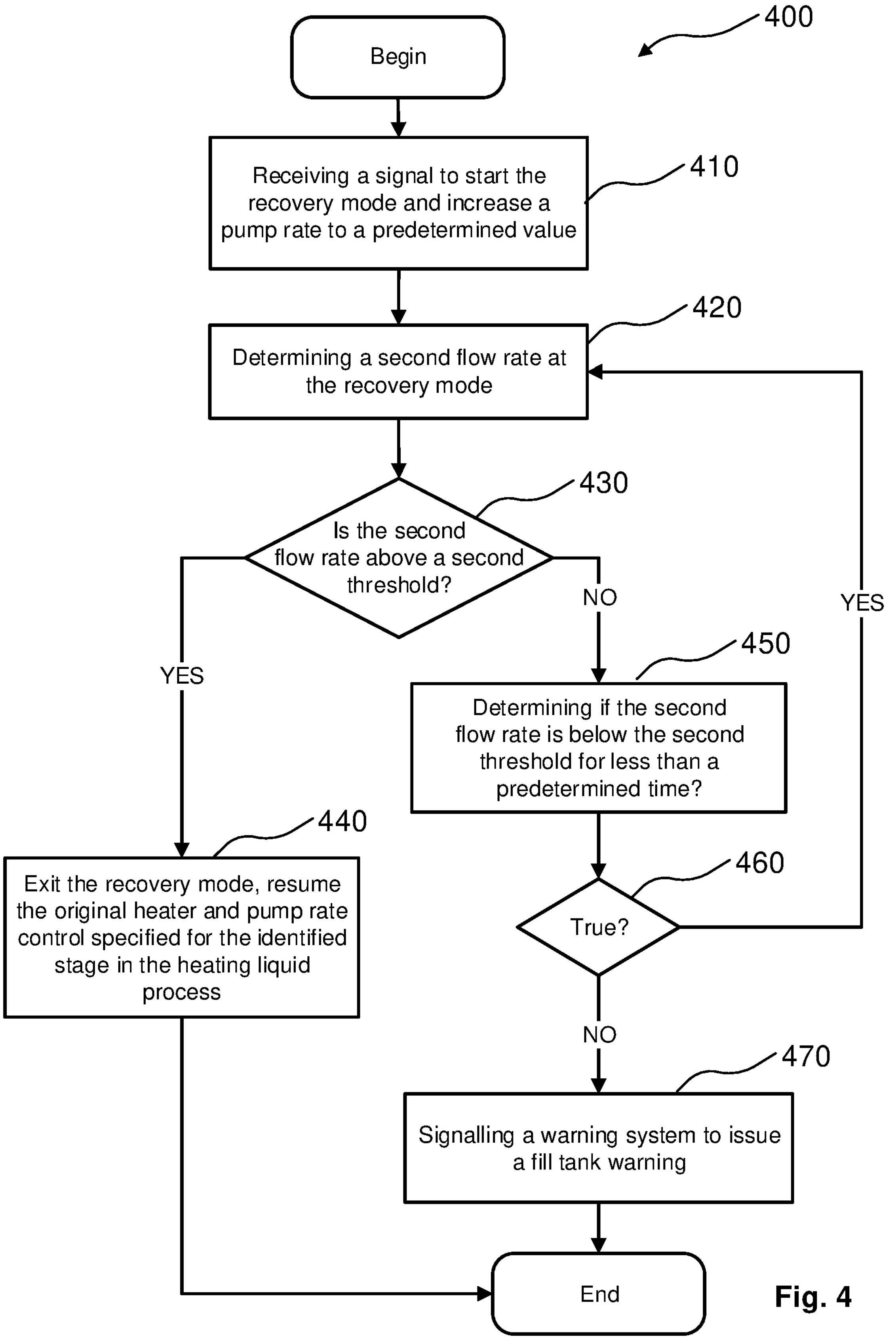
FIG. 4 is a flow chart illustrating operation of the appliance in the cavitation recovery mode in accordance with one embodiment of the present disclosure.

FIG. 4 shows a flow chart of method 400 illustrating an operation of the appliance 100 in the cavitation recovery mode.

The method 400 begins at step 410 of receiving a signal to start the recovery mode and to increase the pump rate. The signal may include a predetermined value indicating percentage of capacity to which the pump rate is to be increase. For example, the predetermined value can be set as 100% based on firmware coding during the manufacture of the appliance. Alternatively, the predetermined value may be determined by the controller 1501 based on the user input via the user input device 1513 and the current stage in the beverage making process.

The controller 1501 then directs the pump control circuit to increase the pump rate to the predetermined value, for example, 100% of capacity. Is should be noted, that the pump 108 typically operates at about 55% of its capacity or less at various stages of the beverage making process. Once the pump rate is increased to a desired capacity and during operation of the pump 108 in the cavitation recovery mode, the controller 1501 may move to step 420 to determine the second flow rate. Alternatively, the controller 1501 may be configured to wait for a period of time from the time of starting the recovery mode before determining the second flow rate. The period of time may be set in memory of the 1509 in a non-volatile manner. For example, the controller 1501 may allow the pump 108 to operate for 2 seconds at 100% capacity before determining the second flow rate.

At step 420, the controller 1501 receives a signal from the sensor assembly 106 indicating the second flow rate during the cavitation recovery mode. As discussed above, the signal may include a value of the second flow rate in number of pulses (flow counter μC) or a Boolean value indicating whether the second flow rate is above or below the second threshold. In this embodiment, the second threshold is preferably 10 counts. Other values of the second threshold are also possible.

Once the second flow rate is determined at step 420, the controller 1501 moves to step 430 of determining if the second flow rate is above the second threshold. If the controller 1501 determines at step 430 that the second flow rate is above the second threshold, the cavitation recovery mode concludes and the appliance 100 may resume its normal operation in accordance with the user input at 210. For example, if the heater 110 was previously switched off, the heater 110 may resume heating and in accordance with original heating parameters prior to the heater 110 being switched off. The original heating parameters can be determined based on data stored at step 370. Essentially, if the first flow counter μC is below 3 counts or pulses after pre-infusion, the pump 108 can be switched to operate at 100% capacity until the second flow counter μC is equal to or above 10 pulses.

Additionally, control parameters of the pump 108 may return to respective original values determined based on data stored at step 370. Returning to the original values may include determining at which stage in the beverage making process the appliance operated prior to switching to the second mode; and determining parameters for switching the pump 108 from the second mode to the first mode based on the determined stage. Once the pump 108 is returned to the first mode, method 400 concludes.

If the controller 1501 determines that the second flow rate is below the second threshold, the control is then moved to step 450 of determining if the second flow rate is below the second threshold for less than a threshold period of time since the time of increasing the pump rate to the predetermined value at step 410. The period of time can be 5 seconds depending on implementation. The threshold period of time can be set in memory 1509 in a non-volatile manner.

If the controller 1501 determines at step 460 that the second flow rate is below the second threshold for less than the predetermined period of time, the controller 1501 then moves to step 420 to determine the second flow rate again and check if it has increased. Otherwise, if the controller 1501 determines at step 460 that the second flow rate is below the second threshold for a period of time exceeding the threshold period of time, the controller 1501 determines that the tank 102 of the appliance 100 is likely to be empty and moves to step 470 to switch off the pump 108 and, optionally, the heater 110 and signal to the warning system of the appliance 100 that the tank 102 is likely to be empty. The warning system in turn can issue a fill tank warning to an output device 1514 providing the user interface of the appliance 100. The method 400 then concludes.

Figure 5:
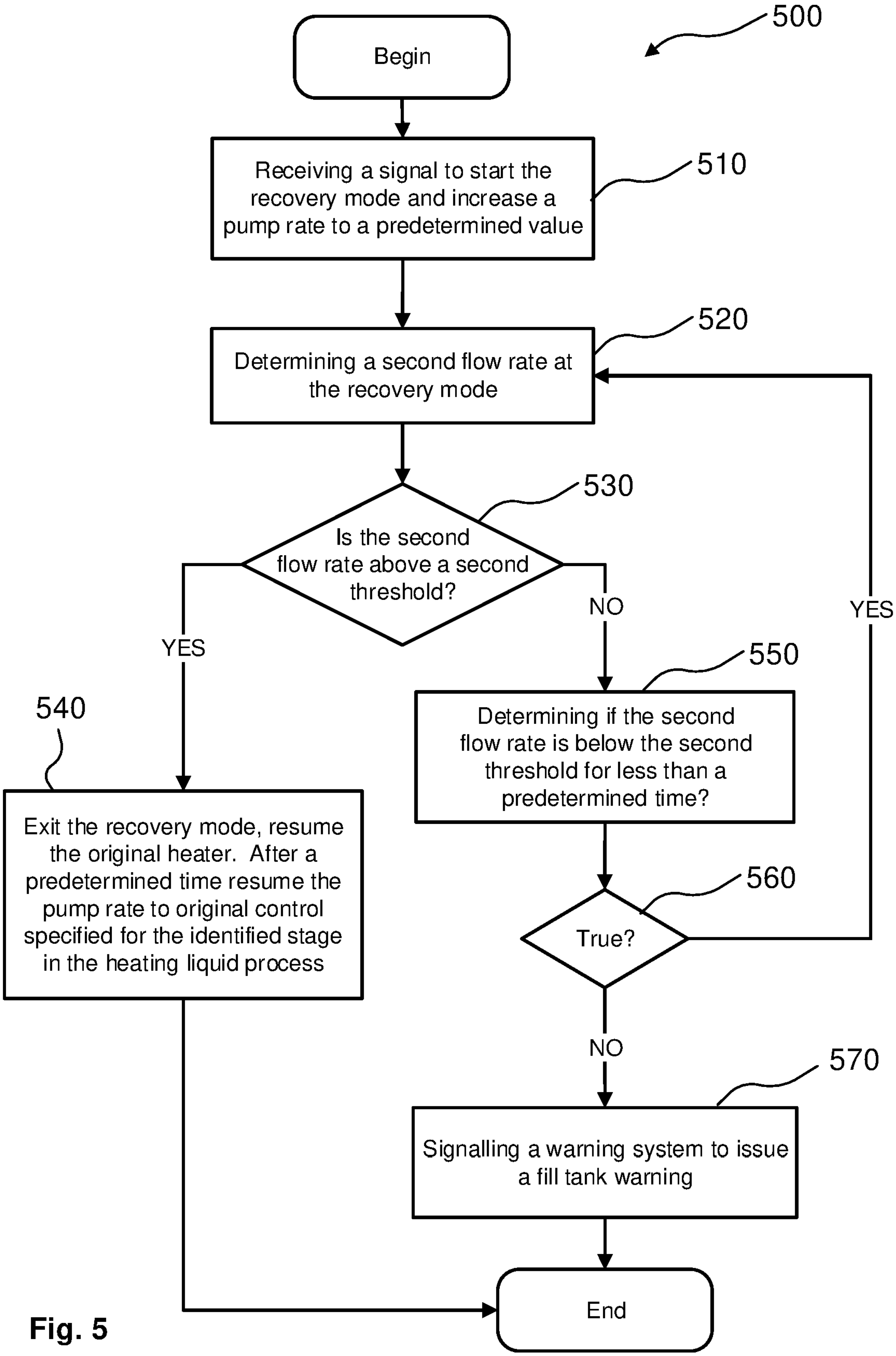
FIG. 5 is a flow chart illustrating operation of the appliance in the cavitation recovery mode in accordance with an alternative embodiment of the present disclosure.

FIG. 5 shows a flow chart of method 500 illustrating an alternative operation of the appliance in the cavitation recovery mode.

Operation of the controller 1501 in accordance with the method 500 is similar to the operation of the controller described with references to FIG. 4. As such, FIG. 5 will be described with reference to FIG. 4 and only steps which are different to those of FIG. 4 will be described in detail.

Specifically, operation of steps 510, 520, 550, 560 and 570 is very similar to operation of steps 410, 420, 450, 460 and 470 of FIG. 4. Step 530 is otherwise identical to step 430 except the second threshold at step 530 of the method 500 is the same as the first threshold, i.e. 3 pulses. Additionally, at step 540 the controller 1501 resumes normal operation of the pump 108 to the original pump rate only after waiting for some time, e.g. 2 seconds, since step 530 first detected that the second flow rate is above the second threshold. Otherwise step 540 is identical to step 440 of FIG. 4.

Figure 8:
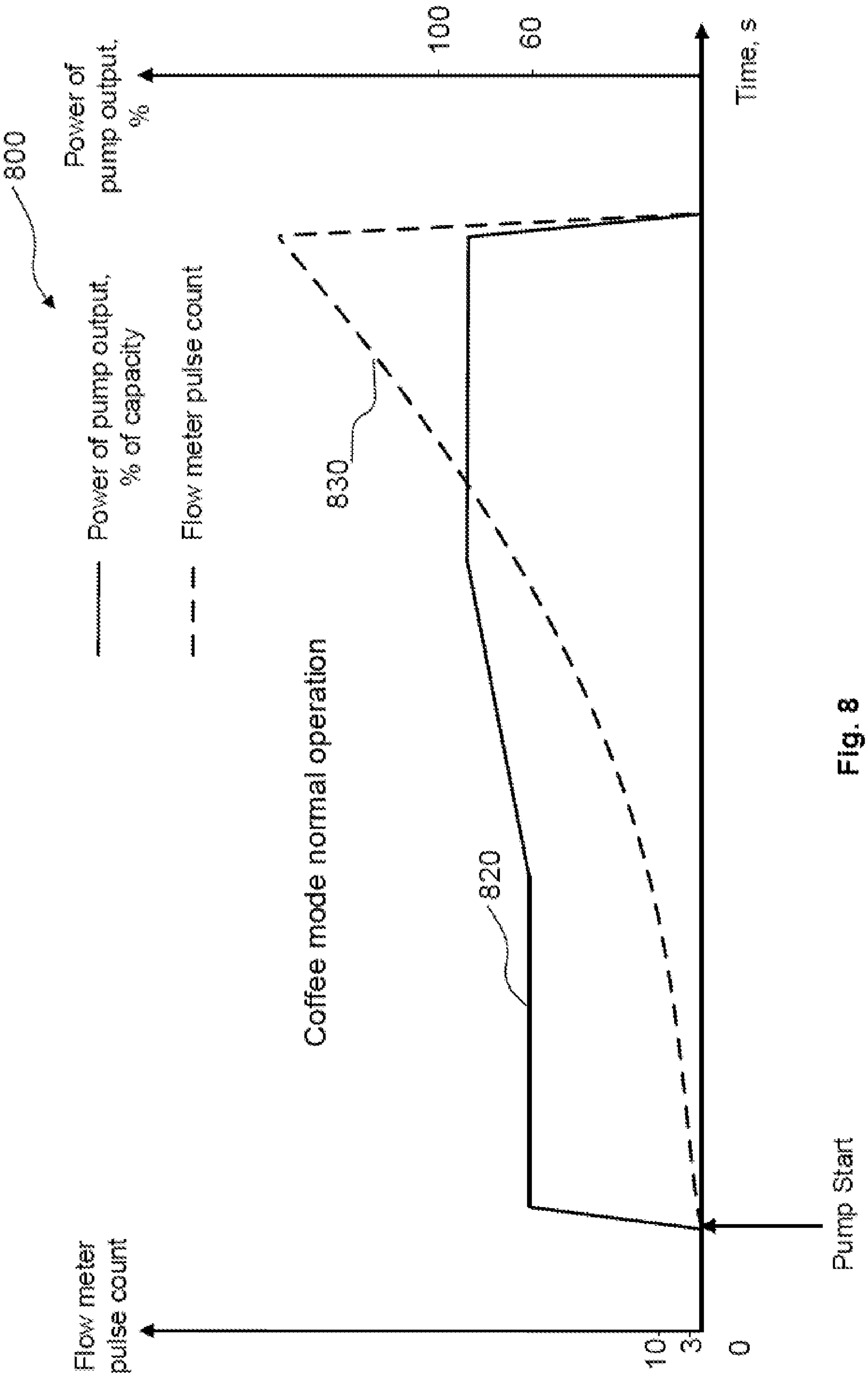
FIG. 8 is a schematic graph representing normal operation of the appliance in coffee mode.

The determining that the first flow rate is below the first threshold allows the controller 1501 to determine when dry pumping or cavitation had occurred from feedback in the sensor assembly 106, such as a flow meter. Dry pumping occurs if no water flows though the hydraulic system, as shown as flow meter pulse counter 730 at FIG. 7, despite the pump 108 working at its intended capacity shown as 720 at FIG. 7. FIG. 8 shows normal coffee mode operation where a flow meter pulse counter 830 is steadily increasing when the pump 108 is operating at or above its intended capacity 820.

Figure 9:
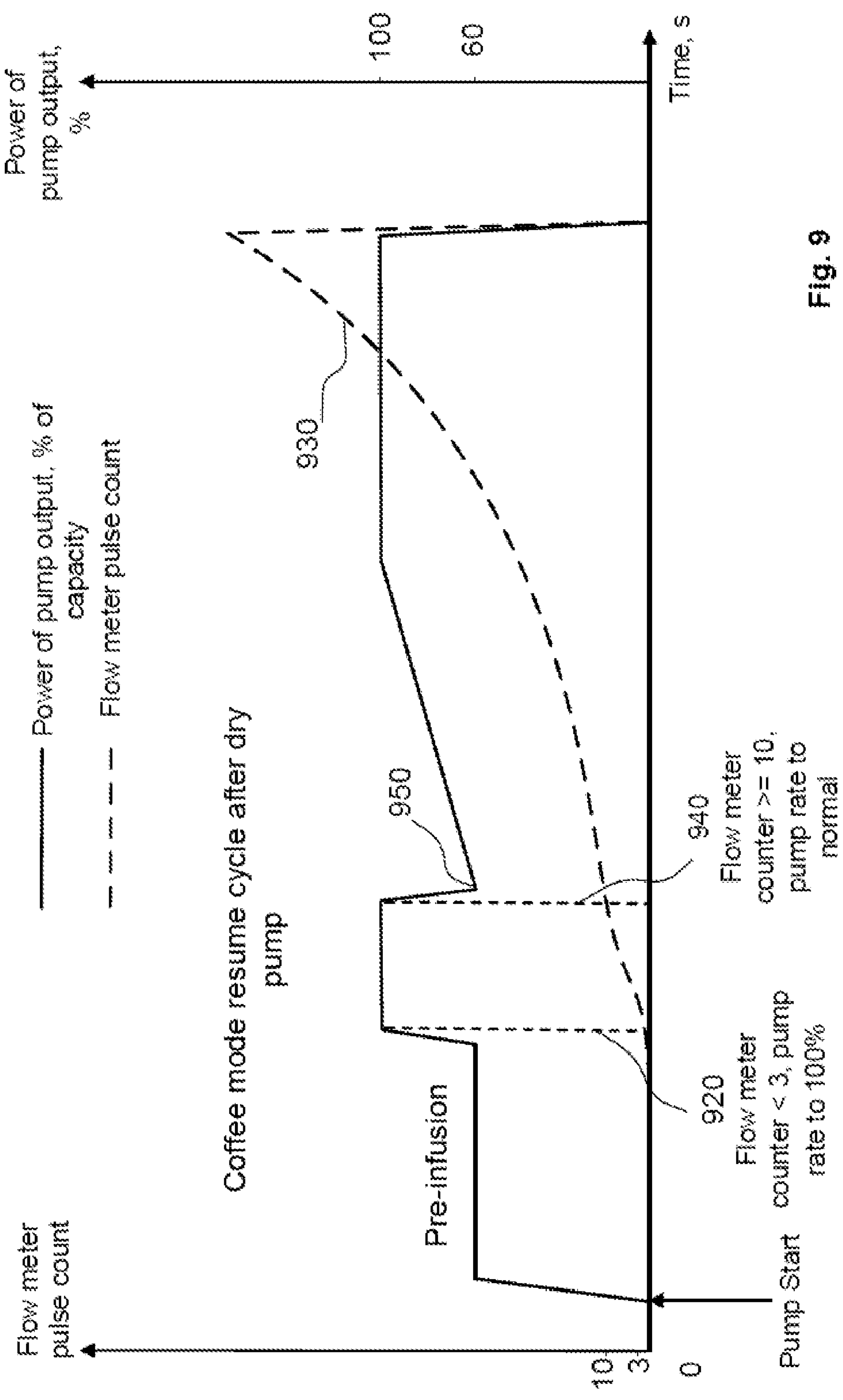
FIG. 9 is a schematic graph showing an effect of the present disclosure on the flow rate.

If the first flow rate is below the first threshold, the flow meter 106 can effectively detect that there is no water flow during the brew or steaming cycle. Once no water flow is detected, the controller 1501 triggers at the first vertical dashed line 920 of FIG. 9 the pump 108 to operate at 100% its capacity instead of its selected reduced capacity. As discussed above, the selected reduced capacity is setting dependent and can be at 55%, for example. This 100% pump capacity ensures cavitation is overcome or at least substantially reduced, forcing water through the hydraulic system at higher pressure and removing air pockets accumulated in the hydraulic system. As shown in FIG. 9, the flow meter pulse counter 930 begins to steadily increase after the pump 108 is set to operate at the increased capacity. Once water is flowing through the hydraulic system again, the flow meter 106 is able to detect this at the second vertical dashed line 940 of FIG. 9 and then triggers the hydraulic system to operate the pump 108 at its intended capacity, i.e. back again to 55% shown at 950, as set for a particular stage in the beverage making process. The microcontroller of the flow meter can essentially check that the flow counter 930 is above the second predetermined threshold, 10 in this instance, to determine that water is flowing through the hydraulic system again. Optionally, a delay can be added from the period when water is sensed flowing in the hydraulic system until the pump 108 is operating back to its intended capacity. The delay can ensure all air bubbles are flushed from the hydraulic system and cavitation is substantially eliminated.

FIG. 9 is a schematic graph showing the effect of the present disclosure on the flow rate of water through the hydraulic system. Specifically, FIG. 9 shows a line 930 corresponding to the flow meter counter superimposed onto a line 950 representing percentage of the pump power output (or percentage of capacity).

At the pre-infusion stage shown in FIG. 9 the pump 108 is switched on. The pre-infusion stage typically takes about 4 seconds. If the system detects that the flow meter counter 930 is below the first threshold of 3 pulses after first 4 second of the pre-infusion stage as seen by the first dashed vertical line 920, the pump rate is increased to 100%. In response to the pump rate being increased to 100%, water starts flowing through the hydraulic system and the flow meter pulse count 930 start increasing. Once the flow meter pulse count 930 reaches the second threshold, 10 in this implementation, the pump 108 is switched back to its intended capacity for a particular stage in the beverage making process. The pump rate can then be further adjusted depending on a pump rate specified for further stages in the beverage making process.

Figure 10:
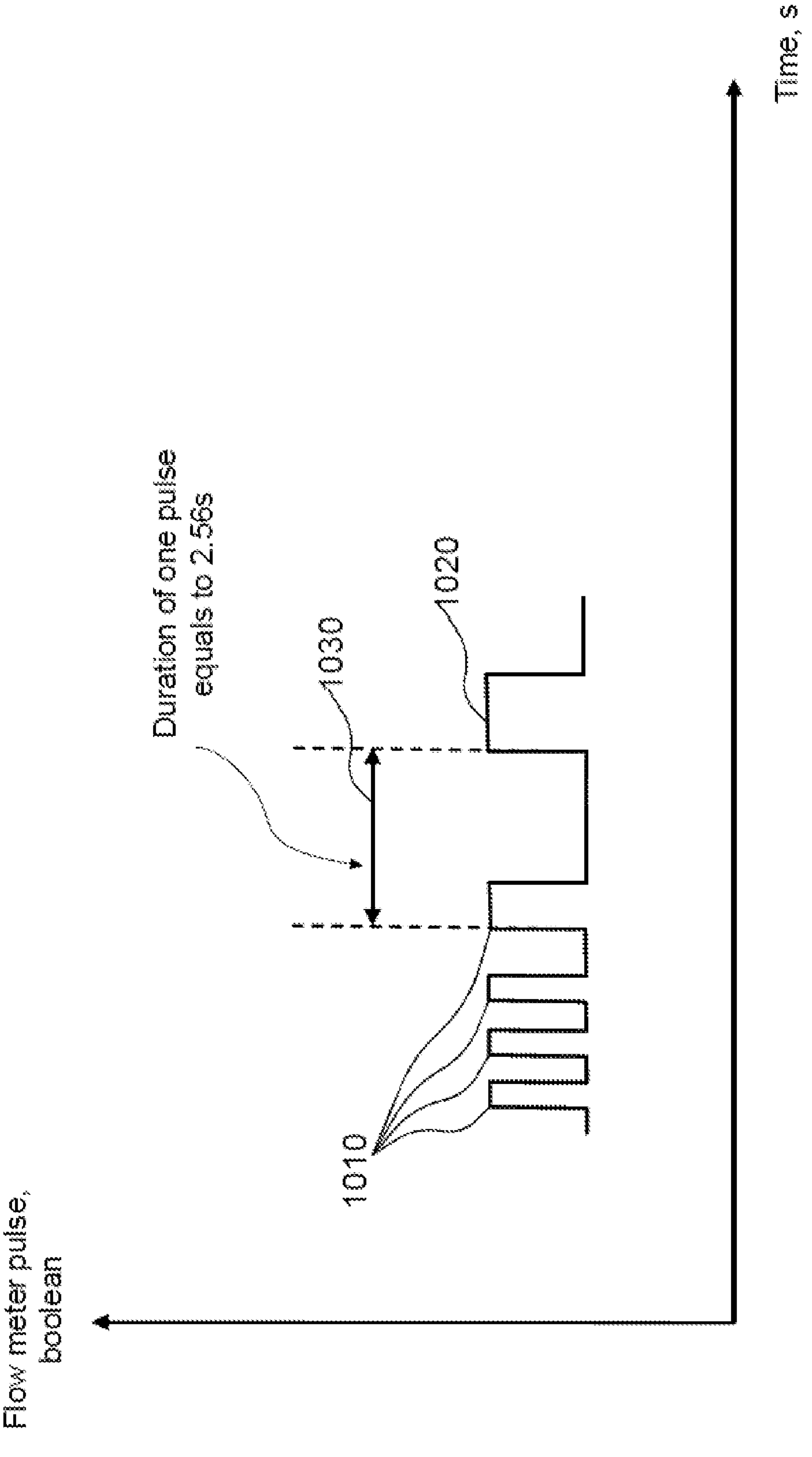
FIG. 10 is a schematic graph illustrating a signal representing a flow rate registered by a flow meter.

FIG. 10 is a schematic graph illustrating a signal representing a flow rate registered by the sensor assembly 106. Essentially, the sensor assembly 106 (a flow meter in this instance) is able to register a pulse 1010 and increment a flow meter counter in response to registering the pulse 1010. The width of the pulse indicates how long it takes for one revolution. For example, 1030 shows that it took 2.56 seconds for one revolution. As such, the width of the pulse 1010 is indicative of how quickly the water flows through the flow meter. For example, a narrower pulse comparatively to another pulse indicative the fluid is flowing more quickly. Consequently, if the pulse is wider, e.g. as 1020, the water flows slower through the flow meter. A wider pulse may also be indicative to the pump 108 switching to a lower pumping capacity. The flow rate is indicative of the number of pulses registered by the flow meter.

The inventors have found that the above described methods are able to substantially overcome, or at least ameliorate, dry pumping/cavitation.

Figure 11A:
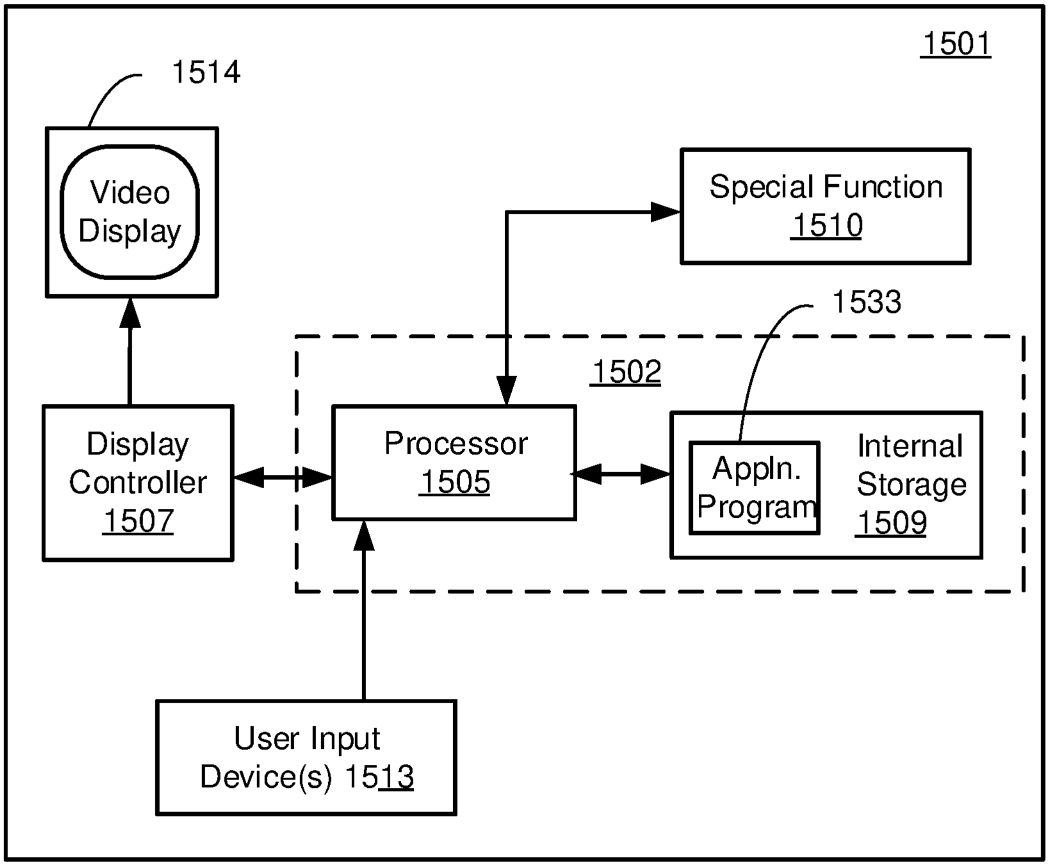
FIGS. 11A and 11B collectively form a schematic block diagram of the controller.
Figure 11B:
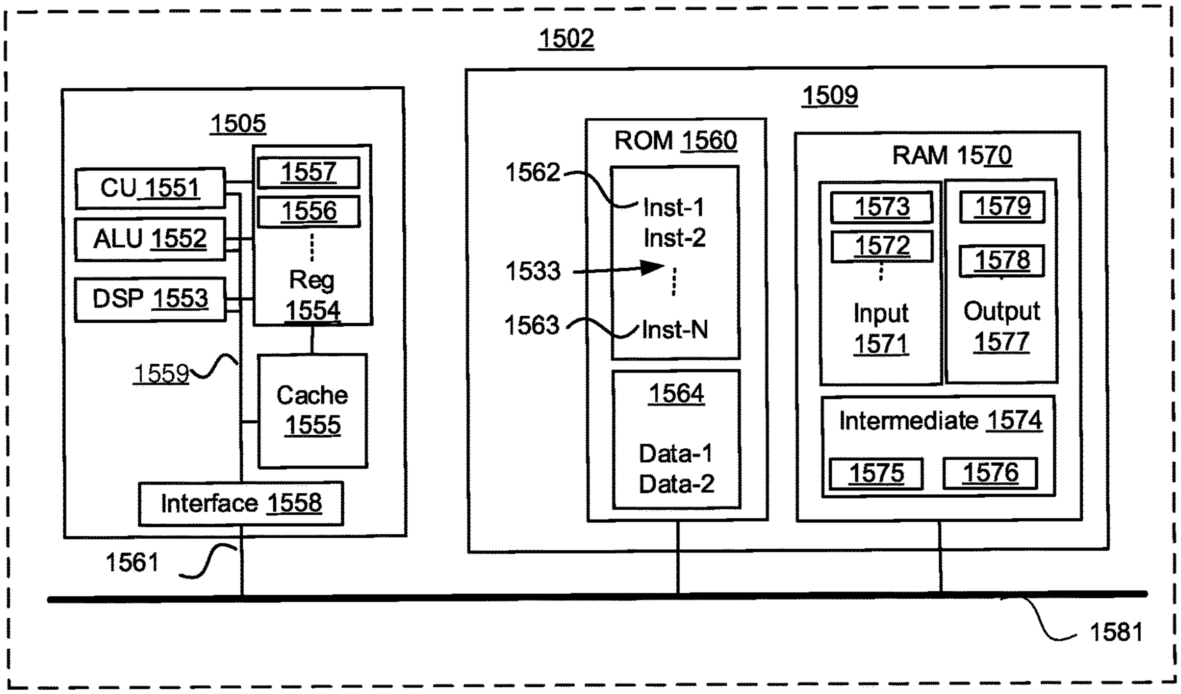

FIGS. 11A and 11B collectively form a schematic block diagram of the controller 1501 including embedded components, upon which the method of controlling an appliance 100 to make a beverage shown in FIGS. 2 to 6 described above are desirably practiced.

As seen in FIG. 11A, the electronic device 1501 comprises an embedded controller 1502. Accordingly, the electronic device 1501 may be referred to as an "embedded device." In the present example, the controller 1502 has a processing unit (or processor) 1505 which is bi-directionally coupled to an internal storage module 1509. The storage module 1509 may be formed from non-volatile semiconductor read only memory (ROM) 1560 and semiconductor random access memory (RAM) 1570, as seen in FIG. 11B. The RAM 1570 may be volatile, non-volatile or a combination of volatile and non-volatile memory.

The electronic device 1501 includes a display controller 1507, which is connected to a video display 1514, such as a liquid crystal display (LCD) panel or the like. The display controller 1507 is configured for displaying graphical images on the video display 1514 in accordance with instructions received from the embedded controller 1502, to which the display controller 1507 is connected.

The electronic device 1501 also includes user input devices 1513 which are typically formed by keys, a keypad or like controls. In some implementations, the user input devices 1513 may include a touch sensitive panel physically associated with the display 1514 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

Typically, the electronic device 1501 is configured to perform some special function. The embedded controller 1502, possibly in conjunction with further special function components 1510, is provided to perform that special function.

The methods described above may be implemented using the embedded controller 1502, where the processes of FIGS. 2 to 6 may be implemented as one or more software application programs 1533 executable within the embedded controller 1502. The electronic device 1501 of FIG. 11A implements the described methods. In particular, with reference to FIG. 11B, the steps of the described methods are effected by instructions in the software 1533 that are carried out within the controller 1502. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 1533 of the embedded controller 1502 is typically stored in the non-volatile ROM 1560 of the internal storage module 1509. The software 1533 stored in the ROM 1560 can be updated when required from a computer readable medium. The software 1533 can be loaded into and executed by the processor 1505. In some instances, the processor 1505 may execute software instructions that are located in RAM 1570. Software instructions may be loaded into the RAM 1570 by the processor 1505 initiating a copy of one or more code modules from ROM 1560 into RAM 1570. Alternatively, the software instructions of one or more code modules may be pre-installed in a non-volatile region of RAM 1570 by a manufacturer. After one or more code modules have been located in RAM 1570, the processor 1505 may execute software instructions of the one or more code modules.

The application program 1533 is typically pre-installed and stored in the ROM 1560 by a manufacturer, prior to distribution of the electronic device 1501. The second part of the application programs 1533 and the corresponding code modules mentioned above may be executed to implement one or more graphical user interfaces (GUIs) to be rendered or otherwise represented upon the display 1514 of FIG. 11A. Through manipulation of the user input device 1513 (e.g., the keypad), a user of the device 1501 and the application programs 1533 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 11B illustrates in detail the embedded controller 1502 having the processor 1505 for executing the application programs 1533 and the internal storage 1509. The internal storage 1509 comprises read only memory (ROM) 1560 and random access memory (RAM) 1570. The processor 1505 is able to execute the application programs 1533 stored in one or both of the connected memories 1560 and 1570. When the electronic device 1501 is initially powered up, a system program resident in the ROM 1560 is executed. The application program 1533 permanently stored in the ROM 1560 is sometimes referred to as "firmware". Execution of the firmware by the processor 1505 may fulfil various functions, including processor management, memory management, device management, storage management and user interface.

The processor 1505 typically includes a number of functional modules including a control unit (CU) 1551, an arithmetic logic unit (ALU) 1552, a digital signal processor (DSP) 1553 and a local or internal memory comprising a set of registers 1554 which typically contain atomic data elements 1556, 1557, along with internal buffer or cache memory 1555. One or more internal buses 1559 interconnect these functional modules. The processor 1505 typically also has one or more interfaces 1558 for communicating with external devices via system bus 1581, using a connection 1561.

The application program 1533 includes a sequence of instructions 1562 though 1563 that may include conditional branch and loop instructions. The program 1533 may also include data, which is used in execution of the program 1533. This data may be stored as part of the instruction or in a separate location 1564 within the ROM 1560 or RAM 1570.

In general, the processor 1505 is given a set of instructions, which are executed therein. This set of instructions may be organised into blocks, which perform specific tasks or handle specific events that occur in the electronic device 1501. Typically, the application program 1533 waits for events and subsequently executes the block of code associated with that event. Events may be triggered in response to input from a user, via the user input devices 1513 of FIG.

11A, as detected by the processor 1505. Events may also be triggered in response to other sensors and interfaces in the electronic device 1501.

The execution of a set of the instructions may require numeric variables to be read and modified. Such numeric variables are stored in the RAM 1570. The disclosed method uses input variables 1571 that are stored in known locations 1572, 1573 in the memory 1570. The input variables 1571 are processed to produce output variables 1577 that are stored in known locations 1578, 1579 in the memory 1570. Intermediate variables 1574 may be stored in additional memory locations in locations 1575, 1576 of the memory 1570. Alternatively, some intermediate variables may only exist in the registers 1554 of the processor 1505.

The execution of a sequence of instructions is achieved in the processor 1505 by repeated application of a fetch-execute cycle. The control unit 1551 of the processor 1505 maintains a register called the program counter, which contains the address in ROM 1560 or RAM 1570 of the next instruction to be executed. At the start of the fetch execute cycle, the contents of the memory address indexed by the program counter is loaded into the control unit 1551. The instruction thus loaded controls the subsequent operation of the processor 1505, causing for example, data to be loaded from ROM memory 1560 into processor registers 1554, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1533, and is performed by repeated execution of a fetch-execute cycle in the processor 1505 or similar programmatic operation of other independent processor blocks in the electronic device 1501.

INDUSTRIAL APPLICABILITY

The arrangements described are applicable to the beverage appliance industry and particularly for the coffee appliance industries.

The foregoing describes only some embodiments of the present invention, and modifications and/or changes can be made thereto without departing from the scope and spirit of the invention, the embodiments being illustrative and not restrictive.

The invention claimed is:

1. An appliance for making a beverage with a liquid, the appliance comprising:

a conduit defining a liquid flow path for the liquid;

a pump to move the liquid under pressure along the flow path, the pump is configured to operate in a first mode and a second mode, wherein the second mode is different to the first mode and is operated in response to detecting cavitation, wherein the pump causes the liquid to move under increased pressure in the second mode than in the first mode to at least aid in resolving cavitation;

a sensor assembly configured to determine a first flow rate of the liquid in the flow path when the pump operates in the first mode and determine a second flow rate when the pump operates in the second mode; and a controller operatively coupled with the pump and the sensor assembly and configured to cause the pump to switch from the first mode to the second mode if the first flow rate is below a first threshold and to cause the pump to switch from the second mode to the first mode if the second flow rate is above a second threshold.

2. The appliance according to claim 1, wherein the pump is configured to operate at a first pump speed in the first mode, and a second pump speed in the second mode, wherein the second pump speed is greater than the first pump speed.

3. The appliance according to claim 1, wherein the controller is configured to apply a delay for switching the pump from the second mode to the first mode if the first threshold and the second threshold are the same.

4. The appliance according to claim 1, wherein the first threshold is equal to the second threshold.

5. The appliance according to claim 1, wherein the controller is further configured to switch off the pump in response to detecting that the second flow rate is below the second threshold for a threshold period of time.

6. The appliance according to claim 5, wherein the controller is further configured to signal a warning system of the appliance that a water tank supplying water to the pump is empty in response to detecting that the second flow rate is below the second threshold for a predetermined period of time.

7. The appliance according to claim 1, wherein the controller is further configured to operate based on a user input.

8. The appliance according to claim 1, wherein the controller is configured to determine at which stage in a beverage making process the appliance operated prior to causing the pump to switch to the second mode and to determine parameters for switching the pump from the second mode to the first mode based on the determined stage.

9. The appliance according to claim 1, further comprising a heater configured to heat the liquid moved by the pump, wherein the controller is further configured to cause the heater to switch off in response to detecting that the first flow rate is below the first threshold.

10. The appliance according to claim 9, wherein the controller is configured to switch on the heater in response to determining that the second flow rate is above the second threshold, the heater being switched on with heating parameters corresponding to heating parameters prior to the heater being switched off.

11. A method of controlling an appliance to make a beverage with a liquid, the method comprising:

controlling a pump of the appliance to operate in a first mode to make the beverage;

determining a first flow rate of the liquid in a flow path defined by a conduit during the first mode;

controlling the pump to switch from the first mode to a second mode if the first flow rate is below a first threshold, wherein the pump is controlled to move the liquid under increased pressure in the second mode than in the first mode to at least aid in resolving cavitation;

determining a second flow rate of the liquid in the flow path during the second mode; and controlling the pump to switch from the second mode to the first mode if the second flow rate is above a second threshold.

12. The method according to claim 11, further comprising controlling the pump to operate in the first mode at a first pump speed, and controlling the pump to operate in the second mode at a second pump speed, wherein the second pump speed is greater than the first pump speed.

13. The method according to claim 11, wherein switching from the second mode to the first mode is delayed by a predetermined delay if the first threshold and the second threshold are the same.

14. The method according to claim 11, wherein the first threshold is equal to the second threshold.

15. The method according to claim 11, further comprising controlling the pump to switch off in response to detecting that the second flow rate is below the second threshold for a threshold period of time.

16. The method according to claim 15, further comprising, in response to detecting that the second flow rate is below the second threshold for a threshold period of time, signaling that a water tank supplying liquid to the pump is empty.

17. The method according to claim 11, wherein the pump is controlled based on a user input.

18. The method according to claim 11, further comprising:

determining at which stage in a beverage making process the appliance operated prior to switch to the second mode; and determining parameters for switching the pump from the second mode to the first mode based on the determined stage.

19. The method according to claim 11, further comprising controlling a heater heating the liquid moved by the pump to switch off in response to detecting that the first flow rate is below the first threshold.

20. The method according to claim 19, further comprising controlling the heater to switch on in response to determining that the second flow rate is above the second threshold, the heater is controlled to switch on with heating parameters corresponding to heating parameters prior to the heater being switched off.

* * * * *